(12) United States Patent
Gitt

(10) Patent No.: US 8,584,543 B2
(45) Date of Patent: Nov. 19, 2013

(54) DRIVE TRAIN OF A MOTOR VEHICLE

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 1401 days.

(21) Appl. No.: 11/478,452

(22) Filed: Jun. 29, 2006

(65) Prior Publication Data

US 2007/0000339 A1    Jan. 4, 2007

(30) Foreign Application Priority Data

Jul. 2, 2005   (DE) .................... 10 2005 030 987

(51) Int. Cl.
*F16H 3/08*       (2006.01)
(52) U.S. Cl.
USPC ................................. 74/331; 74/340; 74/745
(58) Field of Classification Search
USPC ........................................ 74/331, 340, 745
See application file for complete search history.

(56) References Cited

U.S. PATENT DOCUMENTS

| | | | | |
|---|---|---|---|---|
| 3,906,817 A | * | 9/1975 | Kreitzberg | 74/745 |
| 6,339,973 B1 | * | 1/2002 | Monette et al. | 74/745 |
| 6,698,304 B2 | * | 3/2004 | Gierling et al. | 74/340 |
| 7,070,534 B2 | * | 7/2006 | Pelouch | 74/331 |

FOREIGN PATENT DOCUMENTS

| | | |
|---|---|---|
| DE | 35 43 269 | 2/1990 |
| DE | 42 22 035 | 12/1994 |
| DE | 43 16 784 | 11/1995 |
| DE | 102 32 838 | 2/2004 |
| EP | 1 624 232 | 2/2006 |
| WO | WO 2004023003 A1 * | 3/2004 |

* cited by examiner

*Primary Examiner* — Derek D Knight
(74) *Attorney, Agent, or Firm* — Klaus J. Bach

(57) ABSTRACT

In a drive train of a motor vehicle having an engine and a dual-clutch gearbox for transmitting engine power to driven wheels of the motor vehicle, an additional gearbox having at least two shift positions with different transmission ratios is arranged between the engine (5) and the driven vehicle wheels in series with the dual clutch gearbox.

9 Claims, 1 Drawing Sheet

DRIVE TRAIN OF A MOTOR VEHICLE

BACKGROUND OF THE INVENTION

The Invention relates to a drivetrain of a motor vehicle including an engine, a dual clutch transmission and vehicle wheels driven by the engine via the transmission.

Such a drive train is disclosed, for example, by DE 43 16 784 A1, which discloses a drive train for a motor vehicle which comprises an engine, a dual-clutch gearbox and driven vehicle wheels.

It is the object of the invention to provide a drive train of a motor vehicle with high mechanical efficiency, and high operating efficiency in order to achieve low fuel consumption but still providing a high level of operating comfort for the vehicle including the drive train.

SUMMARY OF THE INVENTION

In a drive train of a motor vehicle having an engine and a dual-clutch gearbox for transmitting engine power to driven wheels of the motor vehicle, an additional gearbox having at least two shift positions with different transmission ratios is arranged between the engine (5) and the driven vehicle wheels in series with the dual clutch gearbox.

The power and torque flow between the engine and the driven vehicle wheels can therefore be geared up or geared down (hereinafter uniformly expressed as "geared") both in the dual-clutch gearbox and in the additional gearbox. Through suitable selection of the gear ratios for the transmission steps of the additional gearbox multiple uses are available for the gears of the dual-clutch gearbox, depending on the number of transmission ratios provided by the additional gearbox. This makes it possible to achieve a wide transmission ratio range of the overall transmission comprising the dual-clutch gearbox and the additional gearbox, without modifying the design of the gear train of the dual-clutch gearbox.

The additional gearbox may have two or more transmission stages, which may each have a transmission ratio of i<1 (step-up with torque reduction) i=1 (direct drive) or i>1 (step-down with a torque increase). The utility of the gears of the dual-clutch gearbox is multiplied according to the number of transmission ratios of the additional gear box. The greater number of gear stages means that the engine of the motor vehicle can always operate at or close to its optimum fuel consumption. The arrangement according to the invention therefore results in reduced fuel consumption compared to vehicles that do not have a drivetrain according to the invention.

In principle the additional gearbox may be arranged before or after the dual-clutch gearbox in the power and torque flow.

In one embodiment the additional gearbox is arranged in the power and torque flow between the dual-clutch gearbox and the driven vehicle wheels, that is to say on the output side of the dual-clutch gearbox as a so-called rear-mounted auxiliary gearbox. This arrangement has the advantage that, although a torque generally already increased by the transmission steps of the dual-clutch gearbox, is present on the transmission input shaft of the rear-mounted auxiliary gearbox, the input speed is reduced in relation to the engine speed. The bearings used in the rear-mounted auxiliary gearbox are therefore stressed to a lesser degree as the rotational speeds are relatively low and can therefore be dimensioned accordingly. This leads to a cost-effective design of the corresponding bearings for the shafts in the rear-mounted auxiliary gearbox. Moreover, the dual-clutch gearbox is subjected only to the torque delivered by the engine and not to a torque increased by a front-mounted auxiliary gearbox.

In a particular embodiment the additional gearbox in one shift position has a transmission ratio of i=1. This transmission ratio referred to as direct drive has the advantage that the input shaft and the output shaft of the additional gearbox are locked to one another whereby an efficient power and torque flow can be achieved. In a shift position of the additional gearbox with a transmission ratio of i=1 the transmission ratio of the overall transmission, comprising the dual-clutch gearbox and the additional gearbox, corresponds to the transmission ratio of the dual-clutch gearbox.

In a further development of the invention the additional gearbox in one shift position has a transmission ratio of i>1. Although, as already stated, a step-up (i<1) is possible, a step-down (i>1) provides for an increased torque, which can have a decisively positive influence particularly on starting sequences or on the acceleration performance of motor vehicles, and the dual clutch gear box is not subjected to the increased torque.

In an advantageous embodiment the additional gearbox has a shift position with a transmission ratio in which the overall transmission ratio of the dual-clutch gearbox and the additional gearbox in any selected gear of the dual-clutch gearbox is greater than the maximum transmission ratio of the dual-clutch gearbox (first gear=highest transmission ratio) with a transmission ratio of the additional gearbox of i=1. In this embodiment therefore the following equation always applies:

$$i_{DGKx} * i_{ZG>1} > i_{DGKmax}$$

wherein:
$i_{DGKx}$ is the transmission ratio of the dual-clutch transmission in gear x
$i_{ZG>1}$ is the transmission ratio of the additional gearbox with a transmission ratio of i>1
$i_{DGKmax}$ is the maximum transmission ratio of the dual-clutch gearbox (lowest gear).

In a further advantageous embodiment the ratio range of the additional gearbox is somewhat greater than the ratio range of the dual-clutch gearbox. In this case the additional gearbox serves as a genuine range group. If the range of the additional gearbox is smaller than the rage of the dual-clutch gearbox, not all gears of the dual-clutch gearbox are used in all transmission ratio settings of the additional gearbox.

The additional gearbox may take the form of an automatic transmission or a semi-automatic shift manual shift gearbox. Both types of transmissions afford the advantage that a driver of the motor vehicle is able to operate them without significant effort. Moreover, automatic gear changing with a corresponding control or feedback control is more manageable, so that incorrect or inept operation can be routinely avoided. Nevertheless a manual gear change by the driver is also possible without departing from the scope of the invention.

An additional gearbox in the form of a planetary transmission permits gear changing under load, that is to say, with the uninterrupted transmission of torque. For this purpose planetary transmissions are generally equipped with friction clutches and/or brakes in the form of disc packs, which are operated wet, that is oil-lubricated, or dry. A gear change under load can be performed by simultaneous opening and closing of disc packs. However, the application and maintenance of the force needed for tightening of the disc pack, generally transmitted hydraulically, has an efficiency-reducing effect.

More beneficial from the point of view of mechanical efficiency is a non-load-changeable clutch, for example a claw clutch or a gearshift sleeve clutch, in each case with synchromesh device.

The additional gearbox may also take the form of a countershaft transmission. Gear changing is performed by way of a manually operated shift device or a shift device operated by means of a hydraulic or electromagnetic actuator. Countershaft transmissions can be cost effectively produced, and may even use identical parts of the gear trains of the dual-clutch gearbox.

In a further development of the invention geometrically progressive ratios exist between at least some of the gears of the dual-clutch gearbox. This means that before and after a gear change of the additional gearbox the same or similar gear transmission steps occur when shifting through the gears of the dual-clutch gearbox from the lowest to the highest gear. This increases the ride comfort of the vehicle, since a downward gear progression in the dual-clutch gearbox would lead to an increment in the upward gear progression following the gear change in the additional gearbox.

Two embodiments of the drivetrain according to the invention will be described in more detail below with reference to the accompanying drawings.

DETAILED DESCRIPTION OF PARTICULAR EMBODIMENT

Figure 1:
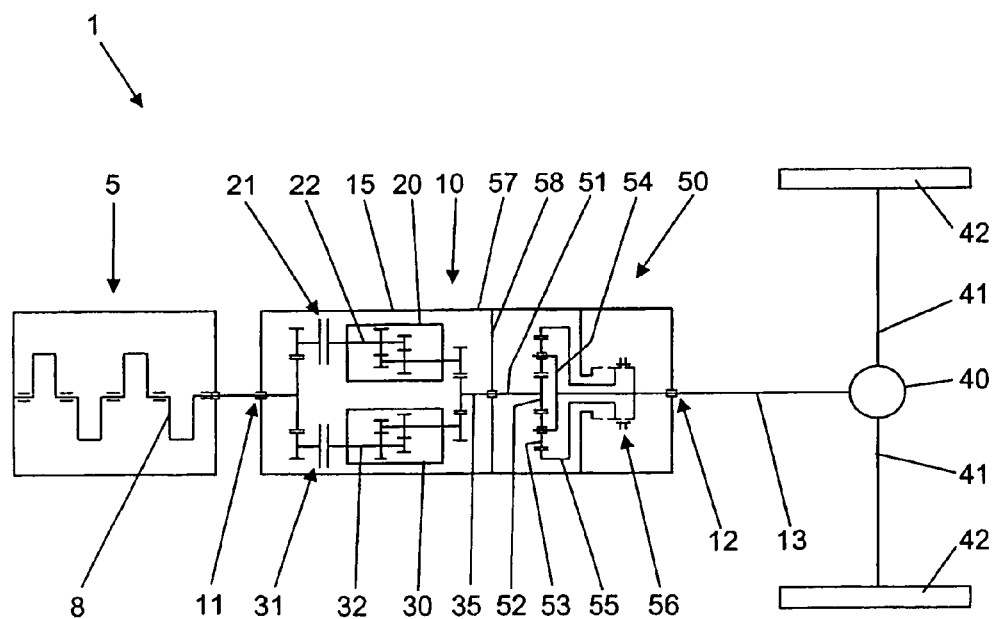
FIG. 1 shows schematically a drive train according to the invention having an rear-mounted auxiliary gearbox of planetary gear type and FIG. 2 shows schematically a rear-mounted auxiliary gearbox of the drivetrain according to the invention of countershaft type.

FIG. 1 represents a drivetrain 1 according to the invention of a commercial vehicle (not shown) having a dual-clutch gearbox 15 and a rear-mounted auxiliary gearbox 50 connected to the output side of the dual-clutch gearbox 15.

The crankshaft 8 of an internal combustion engine 5 is drive-connected to an input 11 of a transmission 10. The transmission 10 shown separated from the engine 5 in FIG. 1 may naturally also be locked to the housing of the engine 5. The output 12 of the transmission 10 is connected by way of a transmission output shaft 13 to an axle differential 40, from which drive shafts 41 extend to the wheels 42 of a driven vehicle axle.

The transmission 10 comprises a dual-clutch gearbox 15, which in FIG. 1 is represented schematically as two parallel gear trains 20, 30, each with a clutch 21, 31. In a dual-clutch gearbox 15 optimally configured for the available space, however, the clutches 21, 31 are generally arranged coaxially with countershafts 22, 32 arranged in spaced relationship.

The two gear trains 20, 30 are connected to one another on the output side by a central shaft 35. This central shaft 35 is at the same time the input shaft 51 of the rear-mounted auxiliary gearbox 50.

In FIG. 1 the rear-mounted auxiliary gearbox 50 and the dual-clutch gearbox 15 are arranged in a common housing 57, the two gearboxes 15, 50 being spatially separated by a housing wall 58, in which the input shaft 51 of the rear-mounted auxiliary gearbox 50 is supported. It is also possible, however, to design the drivetrain 1 with gearboxes 15, 50 completely separated from one another. Thus, in contrast to the arrangement represented in FIG. 1, for example, the rear-mounted auxiliary gearbox 50 could be shifted towards the axle differential 40 or even connected to the latter in order to take account of restricted installation space or to accommodate an essential or specially required weight distribution.

As shown in FIG. 1, the rear-mounted auxiliary gearbox 50 is designed in the form of a planetary transmission, wherein all the gears of the auxiliary gear box (50) are arranged in a single gear plane. In this case the input shaft 51 arranged coaxially with the transmission output shaft 13 and carries a sun gear 52. The sun gear 52 conventionally meshes with a plurality of planet gears 53 which are distributed around the sun gear 52 and which in turn radially mesh externally with an internal gear 55. At the same time the planet gears 53 are rotatably supported on a planet carrier 54. The planet carrier 54 is mounted for rotation with the transmission output shaft 13.

The planet carrier 54 can moreover be coupled to the internal gear ring 55, which is rotatably supported in relation to the housing 57. By way of a shift device 56 the internal gear ring 55 can be rotationally locked either to the planet carrier 54 and hence to the transmission output shaft 13, or to the housing 57 of the rear-mounted auxiliary gearbox 50. For this purpose the shift device 56 has synchromesh devices, not represented in FIG. 1, which each serve to adjust the speeds of each of the shafts 13, 55, 57 involved relative to one another.

A rotationally locked connection between the planet carrier 54 and the internal gear ring 55 means that the planet carrier 54 can no longer rotate within the internal gear ring 55. The planet carrier 54 and the internal gear 55 are instead locked to one another. The transmission input shaft 51 and the transmission output shaft 13 thereby rotate at the same speed. In this way a transmission ration of i=1 can be achieved in the rear-mounted auxiliary gearbox 50.

A rotationally locked connection between the internal gear 55 and the housing 57 of the rear-mounted auxiliary gearbox 50 by way of a gearshift sleeve 56 moved to the right in FIG. 1 causes the internal gear 55 to interlock with the housing 57 of the rear-mounted auxiliary gearbox 50, so that it cannot rotate in relation to the latter. The planet gears 53 thereby run in the internal gear 55 as soon as they are driven by the sun wheel 52. The planet carrier 54 is set in rotation by the bearing of the planet gears 53, thereby driving the transmission output shaft 13 and hence also the vehicle wheels 42. The transmission ratio of the rear-mounted auxiliary transmission 50 is determined by the geometric configuration of the pitch circles of the sun wheel, planet gears and internal gear 52, 53, 55 relative to one another.

Figure 2:
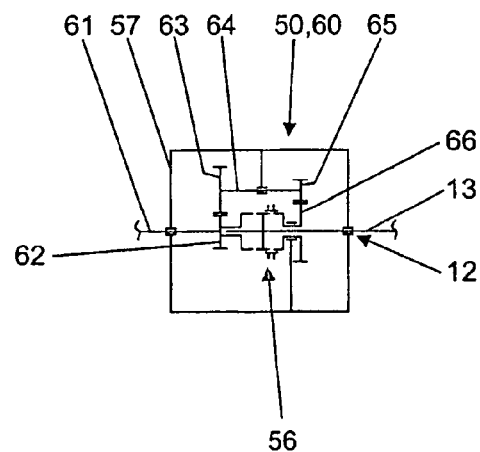

FIG. 2 represents a rear-mounted auxiliary gearbox 50 in the form of a countershaft transmission 60. The input shaft 61 is rotationally locked to a spur gear 62. This spur gear 62 meshes with an input gear 63, which is rotationally locked to a countershaft 64, arranged parallel to the input shaft 61 and supported so that it can rotate in relation to the housing 57. An output gear 65, likewise rotationally locked to the countershaft 64, meshes with a loose gear 66, which is arranged coaxially with the transmission output shaft 13 and is likewise supported so that it can rotate relative to the housing 57.

The loose gear 66 is connected to the transmission output shaft 13 in the right-hand position of the gearshift sleeve of the shift device 56 shown in FIG. 2. As in FIG. 1, a synchromesh device necessary for adjusting the speeds of the rotating components is not shown. By way of the spur gear 62, the countershaft 64 and the loose gear 66, the input shaft 61 is connected to the transmission output shaft 13, reducing the speed and at the same time increasing the torque (i>1).

By way of a left-hand position of the gearshift sleeve of the shift device 56 the spur gear 62 and hence the input shaft 61 is made to interlock with the transmission output shaft 13. A direct drive (i=1) can thereby also be established with the countershaft transmission 60.

In order to relieve the bearing of the countershaft 64, for example, one or more additional countershafts may be provided in the rear-mounted auxiliary gearbox 60.

In both, a rear-mounted auxiliary gearbox 50 as represented in FIG. 1 and in a rear-mounted auxiliary gearbox 60 as shown in FIG. 2, a shift sequence via the shift device 56 in the rear-mounted auxiliary gearbox 50, 60 is generally initiated by bringing both clutches 21, 31 of the dual-clutch gearbox 15 into an opened position so that no torque can is-transmitted from the engine 5 to the rear-mounted auxiliary gearbox 50. The gearshift sleeve 56 is then shifted from the one engagement position via a neutral position into the other engagement position. This shift sequence can be performed manually or pneumatically or hydraulically assisted. An adjustment of the gearshift sleeve 56 undertaken by an electric motor is also possible.

What is claimed is:

1. A drive train (1) of a motor vehicle having an engine (5), a gearbox (10) and driven vehicle wheels (42), the gear box (10) including a dual clutch transmission structure (15) having two parallel gear transmissions (20, 30) with a common end shaft (35), an auxiliary transmission structure (50) having a single input shaft (51) connected to, or forming an extension of, the end shaft (35) of the dual clutch gear transmission structure (15) and including at least two shift positions with different transmission ratios and a single shifting mechanism (56) for shifting the auxiliary transmission between the at least two shift positions, the auxiliary transmission structure (50) being drive-connected to the driven vehicle wheels (42) via an output shaft (13).

2. The drive train (1) as claimed in claim 1, wherein the auxiliary transmission structure (50) is arranged in the power and torque flow between the dual-clutch transmission structures (15) and the driven vehicle wheels (42).

3. The drive train (1) as claimed in claim 1, wherein the auxiliary transmission structure (50) in one shift position has a transmission ratio i, wherein i=1.

4. The drive train (1) as claimed in claim 1, wherein the auxiliary transmission structure (50) in one shift position has a transmission ratio i, wherein i>1.

5. The drive train (1) as claimed in claim 1, wherein the auxiliary transmission structure (50) is an automatic gearbox or a semi-automatic gearbox.

6. The drive train (1) as claimed in claim 5, wherein the auxiliary transmission structure (50) is in the form of a planetary transmission having a sun gear (52) connected to the auxiliary transmission input shaft (51), a planetary gear carrier (54) connected to the output shaft (13) and carrying planetary gears (53) and a ring gear (55) in engagement with, and surrounding the planetary gears (53) and a shift device (56) disposed on the output shaft (13) for selectively engaging the ring gear (55) to a fixed part of the shift device (56) for locking the ring gear (55) in position or to the output shaft (13) for locking the ring gear (55) to the planetary ear carrier (54) for locking up the planetary transmission so as to rotate as a unit.

7. The drive train (1) as claimed in claim 1, wherein the available transmission ratio of the auxiliary transmission structure (50) is greater than the range of the dual-clutch transmission structure (15).

8. The drive train (1) as claimed in claim 1, wherein the dual-clutch transmission structure (15) and the auxiliary transmission structure (50) are at least partially enclosed by a common housing part (57).

9. The drive train (1) as claimed in claim 1, wherein the auxiliary transmission structure (15) is a planetary transmission including gears (52, 53, 55) all arranged in a single gear plane.

\* \* \* \* \*